United States Patent
Yuasa

(10) Patent No.: US 10,141,784 B2
(45) Date of Patent: Nov. 27, 2018

(54) POWER RECEIVING DEVICE AND POWER TRANSMITTING DEVICE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 15/065,558

(22) Filed: Mar. 9, 2016

(65) Prior Publication Data
US 2016/0268847 A1    Sep. 15, 2016

(30) Foreign Application Priority Data
Mar. 11, 2015    (JP) ................. 2015-048057

(51) Int. Cl.
| | | |
|---|---|---|
| H01F 27/42 | (2006.01) | |
| H01F 37/00 | (2006.01) | |
| H01F 38/00 | (2006.01) | |
| H02J 50/12 | (2016.01) | |
| H01F 27/28 | (2006.01) | |
| H01F 27/24 | (2006.01) | |
| B60L 11/18 | (2006.01) | |
| H01F 3/10 | (2006.01) | |
| H01F 27/36 | (2006.01) | |
| H01F 27/40 | (2006.01) | |

(Continued)

(52) U.S. Cl.
CPC ............ *H02J 50/12* (2016.02); *B60L 11/182* (2013.01); *H01F 3/10* (2013.01); *H01F 27/24* (2013.01); *H01F 27/28* (2013.01); *H01F 27/365* (2013.01); *H01F 27/40* (2013.01); *H01F 38/14* (2013.01); *H02J 50/00* (2016.02)

(58) Field of Classification Search
CPC . H02J 5/005; H02J 7/025; H02J 17/00; H01F 38/14; B60L 11/182
USPC ......................................................... 307/104
See application file for complete search history.

(56) References Cited

U.S. PATENT DOCUMENTS

| | | | |
|---|---|---|---|
| 7,741,734 | B2 | 6/2010 | Joannopoulos et al. |
| 8,729,859 | B2 | 5/2014 | Cook et al. |

(Continued)

FOREIGN PATENT DOCUMENTS

| | | |
|---|---|---|
| AU | 2006269374 B2 | 1/2007 |
| AU | 2006269374 C1 | 1/2007 |

(Continued)

*Primary Examiner* — Quan Tra
(74) *Attorney, Agent, or Firm* — Oliff PLC

(57) ABSTRACT

A power receiving device includes: a ferrite member including a plurality of pieces of ferrite at least some of which are spaced from adjacent pieces of ferrite; a power receiving coil disposed on a lower surface side of the ferrite member; and a power receiving capacitor disposed on an upper surface side of the ferrite member. The power receiving capacitor has a closed loop circuit including first and second wiring connections and a plurality of capacitor elements connected in parallel between the first wiring connection and the second wiring connection. When the power receiving capacitor and the ferrite member are viewed from the lower surface side of the ferrite member, the closed loop circuit is located behind and within a perimeter of one of the pieces of ferrite. A power transmitting device has a mirror structure to the power receiving device.

6 Claims, 9 Drawing Sheets

(51) Int. Cl.
*H01F 38/14* (2006.01)
*H02J 50/00* (2016.01)

(56) References Cited

U.S. PATENT DOCUMENTS

| | | |
|---|---|---|
| 8,827,058 B2 | 9/2014 | Vollenwyder et al. |
| 2007/0222542 A1 | 9/2007 | Joannopoulos et al. |
| 2008/0116847 A1* | 5/2008 | Loke ................... H02J 5/005 320/108 |
| 2008/0129246 A1 | 6/2008 | Morita et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0007215 A1* | 1/2010 | Sakuma ............... H01F 38/14 307/104 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0156735 A1* | 6/2010 | Nakamura ............ H01Q 1/38 343/788 |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0193749 A1 | 8/2013 | Nakamura et al. |
| 2014/0049212 A1* | 2/2014 | Sawa ................... H01F 38/14 320/108 |
| 2014/0327391 A1 | 11/2014 | Niederhauser et al. |
| 2016/0012967 A1* | 1/2016 | Kurs ..................... H02J 50/12 307/104 |
| 2016/0233723 A1* | 8/2016 | Lestoquoy ............ H02J 50/12 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| DE | 102006025461 A1 | 12/2007 |
| DE | 102007023343 A1 | 12/2007 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2008-120239 A | 5/2008 |
| JP | 2009-501510 A | 1/2009 |
| JP | 2011-188216 A | 9/2011 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2013/108108 A2 | 7/2013 |
| WO | 2014/166967 A1 | 10/2014 |

* cited by examiner

POWER RECEIVING DEVICE AND POWER TRANSMITTING DEVICE

This nonprovisional application is based on Japanese Patent Application No. 2015-048057 filed on Mar. 11, 2015, with the Japan Patent Office, the entire contents of which are hereby incorporated by reference.

BACKGROUND

Technical Field

The disclosed embodiments relate to a power receiving device and a power transmitting device.

Description of the Background Art

Conventionally, there have been proposed a variety of power transmitting and receiving devices transferring electric power contactlessly (see Japanese Patent Laying-Open Nos. 2013-154815, 2013-146154, 2013-146148, 2013-110822, and 2013-126327).

The power receiving device includes a power receiving coil and a power receiving capacitor connected to the power receiving coil. The power transmitting device includes a power transmitting coil and a power transmitting capacitor connected to the power transmitting coil.

Japanese Patent Laying-Open No. 2008-120239 describes a contactless charging system including a power transmitting device and a power receiving device spaced from the power transmitting device. The power transmitting device includes a ferrite member formed of a plurality of split pieces of ferrite, and a power transmitting coil provided on the ferrite member. The power receiving device also includes a ferrite member formed of a plurality of split pieces of ferrite, and a power receiving coil provided on the ferrite member.

SUMMARY

Power receiving and transmitting capacitors can be a variety of capacitors including an air capacitor. The air capacitor is prone to be large in size and is also expensive, and accordingly, in recent years, to obtain a capacitor reduced in size and cost, a capacitor formed by disposing a plurality of small capacitor elements on a substrate has been considered.

Each capacitor element has a small capacitance, and the capacitor is formed by connecting the plurality of capacitor elements in parallel to have an increased capacitance. Specifically, the plurality of capacitor elements are connected in parallel between two wiring connections. Thus, the two wiring connections and the plurality of capacitor elements connected in parallel form a closed loop circuit.

When the power transmitting device and the power receiving device transfer electric power therebetween, the power transmitting coil has a current passing therethrough. The power receiving coil receives electric power from the power transmitting coil which causes a current to pass through the power receiving coil. As the power transmitting coil has a current passing therethrough, each capacitor element of the power transmitting capacitor has a current passing therethrough. Similarly, as the power receiving coil has a power receiving current passing therethrough, some of the power receiving current passes through each capacitor element of the power receiving capacitor.

The power transmitting capacitor is disposed in a vicinity of the power transmitting coil and the power receiving capacitor is disposed in a vicinity of the power receiving coil. When the power transmitting and receiving devices transfer electric power therebetween, a magnetic flux is generated. The magnetic flux enters the power transmitting capacitor and the power receiving capacitor.

For example, when a magnetic flux enters the closed loop circuit of the power receiving capacitor, the magnetic flux induces a current to pass through the closed loop circuit. The induced current passes through the plurality of capacitor elements in a closed loop, for example, which results in the direction of the induced current being different for different ones of the capacitor elements. On the other hand the power receiving current passing through each capacitor element by electric power received by the power receiving coil has the same direction for all of the capacitor elements.

As a result, a current with the induced current added thereon passes through a particular capacitor element. The magnetic flux passes in a periodically varying direction, and accordingly, the induced current passes in a periodically inverted direction (i.e., sometimes the direction of the induced current is a first direction, and other times the direction of the induced current is a second direction opposite the first direction). Similarly, the direction of a current passing through the power receiving coil is also inverted in response to the direction of the magnetic flux, and accordingly, the direction of a received current passing through each capacitor element is also periodically inverted. As a result, a current passing through the particular capacitor element is constantly increased, and hence it causes a detriment, such as high temperature of the particular capacitor.

The present inventors have examined disposing the power receiving coil on the side of a lower surface of the ferrite member and disposing the power receiving capacitor on the side of an upper surface of the ferrite member to reduce the induced current generated in the power receiving capacitor. To reduce the amount of ferrite used, however, it is necessary to dispose a plurality of split pieces of ferrite with a spacing therebetween to form the ferrite member, and the present inventors have found that a magnetic flux enters the power receiving capacitor through a gap formed between the split pieces of ferrite.

The present inventors have thus found that if the power receiving coil is disposed on the side of the lower surface of the ferrite member formed of the plurality of split pieces of ferrite and the power receiving capacitor is disposed on the side of the upper surface of the ferrite member, the power receiving capacitor still has one or more capacitor elements with a large current passing therethrough.

The present inventors have also found that if the power transmitting coil is disposed on the side of an upper surface of a ferrite member formed of a plurality of split pieces of ferrite and the power transmitting capacitor is disposed on the side of a lower surface of the ferrite member, the power transmitting capacitor has some capacitor elements with a large current passing therethrough and the capacitor element thus has a high temperature.

The disclosed embodiments address the issues described above, and relate to a power receiving device and a power transmitting device capable of preventing a capacitor element from attaining a high temperature when the devices transfer electric power therebetween.

The power receiving device comprises: a ferrite member including a plurality of pieces of ferrite, at least some of the pieces of ferrite being spaced from adjacent pieces of ferrite; a power receiving coil disposed on a lower surface side of the ferrite member; and a power receiving capacitor disposed on an upper surface side of the ferrite member. The power receiving capacitor has a closed loop circuit including a first wiring connection, a second wiring connection, and a plurality of capacitor elements connected in parallel between the first wiring connection and the second wiring connection. When the power receiving capacitor and the ferrite member are viewed from the lower surface side of the ferrite member, the closed loop circuit is located behind and within a perimeter of one of the pieces of ferrite.

The power receiving device has pieces of ferrite disposed to cover a closed loop circuit of a power receiving capacitor, and thus, such a configuration can minimize a magnetic flux generated from power transfer entering the closed loop circuit. This can minimize an induced current passing through the closed loop circuit and hence prevent a capacitor element from having an excessive current pass therethrough.

The power transmitting device comprises: a ferrite member including a plurality pieces of ferrite, at least some of the pieces of ferrite being spaced from adjacent pieces of ferrite; a power transmitting coil disposed on an upper surface side of the ferrite member; and a power transmitting capacitor disposed on a lower surface side of the ferrite member. The power transmitting capacitor has a closed loop circuit including a first wiring connection, a second wiring connection, and a plurality of capacitor elements connected in parallel between the first wiring connection and the second wiring connection. When the power transmitting capacitor and the ferrite member are viewed from the upper surface side of the ferrite member, the closed loop circuit is located behind and within a perimeter of one of the pieces of ferrite.

The transmitting device has pieces of ferrite disposed to cover a closed loop circuit of a power transmitting capacitor, and thus, such a configuration can minimize a magnetic flux generated from power transfer entering the closed loop circuit of the power transmitting capacitor. This can minimize an induced current passing through the closed loop circuit and hence prevent a capacitor element from having an excessive current pass therethrough.

The foregoing and other objects, features, aspects and advantages of the embodiments will become more apparent from the following detailed description when taken in conjunction with the accompanying drawings.

DESCRIPTION OF THE PREFERRED EMBODIMENTS

Figure 1:
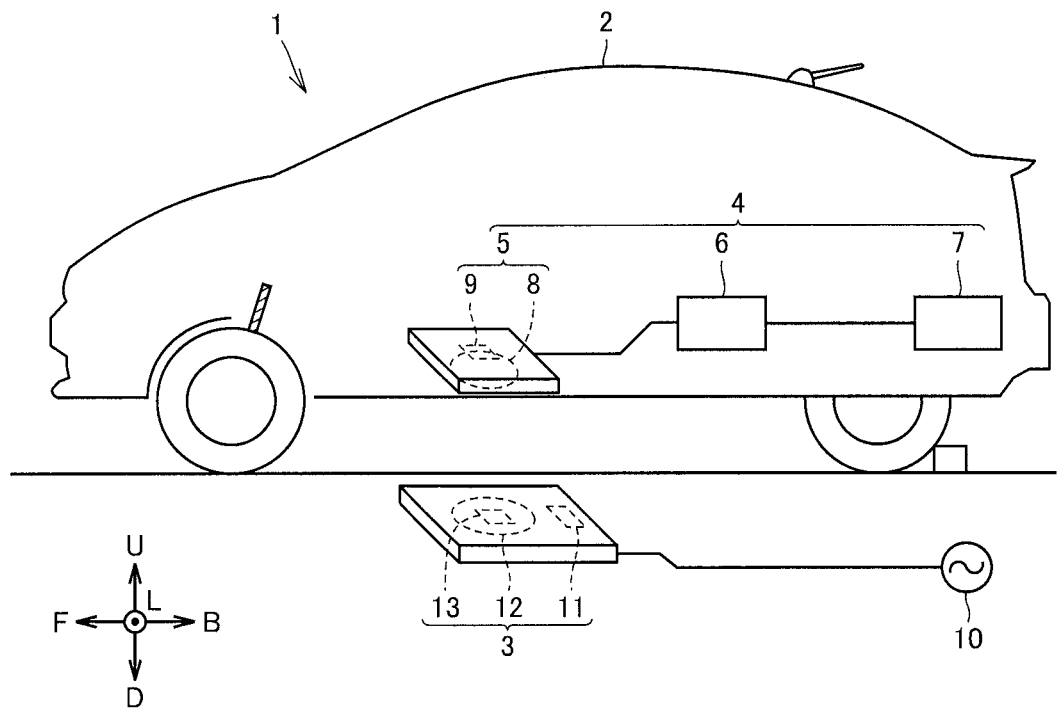
FIG. 1 is a schematic diagram schematically showing a contactless charging system.
Figure 2:
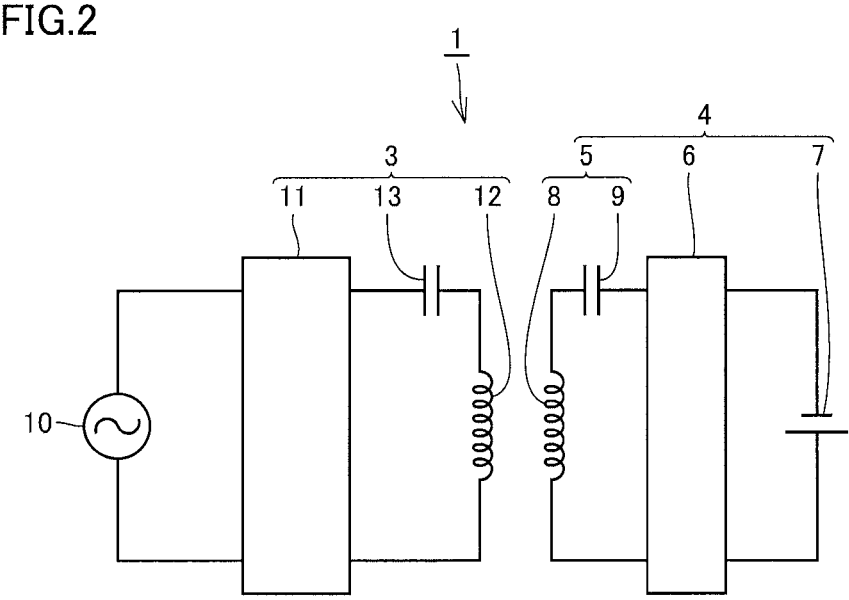
FIG. 2 is a circuit diagram schematically showing contactless charging system of FIG. 1.

FIG. 1 is a schematic diagram schematically showing a contactless charging system 1, and FIG. 2 is a circuit diagram schematically showing the contactless charging system 1. As shown in FIG. 1 and FIG. 2, contactless charging system 1 includes a power receiving unit 4 mounted on a vehicle 2, and a power transmitting device 3 transmitting electric power to power receiving unit 4 contactlessly.

Power receiving unit 4 includes a power receiving device 5 receiving electric power transmitted from power transmitting device 3, a rectifier 6 converting alternating current (AC) power received by power receiving device 5 into direct current (DC) power and also adjusting it in voltage, and a battery 7 storing DC power supplied from rectifier 6.

The electric power stored in battery 7 is supplied to a driving motor (not shown) and the like, and the driving motor drives a vehicular wheel.

Power receiving device 5 includes a power receiving coil 8 and a power receiving capacitor 9 connected to rectifier 6. Power receiving coil 8 and power receiving capacitor 9 form a series LC resonance circuit.

Power transmitting device 3 includes a frequency converter 11 connected to a power supply 10, and a power transmitting coil 12 and a power transmitting capacitor 13 connected to frequency converter 11.

Frequency converter 11 adjusts the frequency of the AC power supplied from power supply 10 and supplies it to power transmitting coil 12 and power transmitting capacitor 13, and also adjusts voltage supplied to power transmitting coil 12 and power transmitting capacitor 13. Power transmitting coil 12 and power transmitting capacitor 13 form a series LC resonance circuit.

The resonant circuit formed of power transmitting coil 12 and power transmitting capacitor 13 and the resonant circuit formed of power receiving coil 8 and power receiving capacitor 9 have resonant frequencies, respectively, matched or substantially matched with each other.

The resonant circuit formed of power transmitting coil 12 and power transmitting capacitor 13 and the resonant circuit formed of power receiving coil 8 and power receiving capacitor 9 have Q values, respectively, both equal to or greater than 100.

Figure 3:
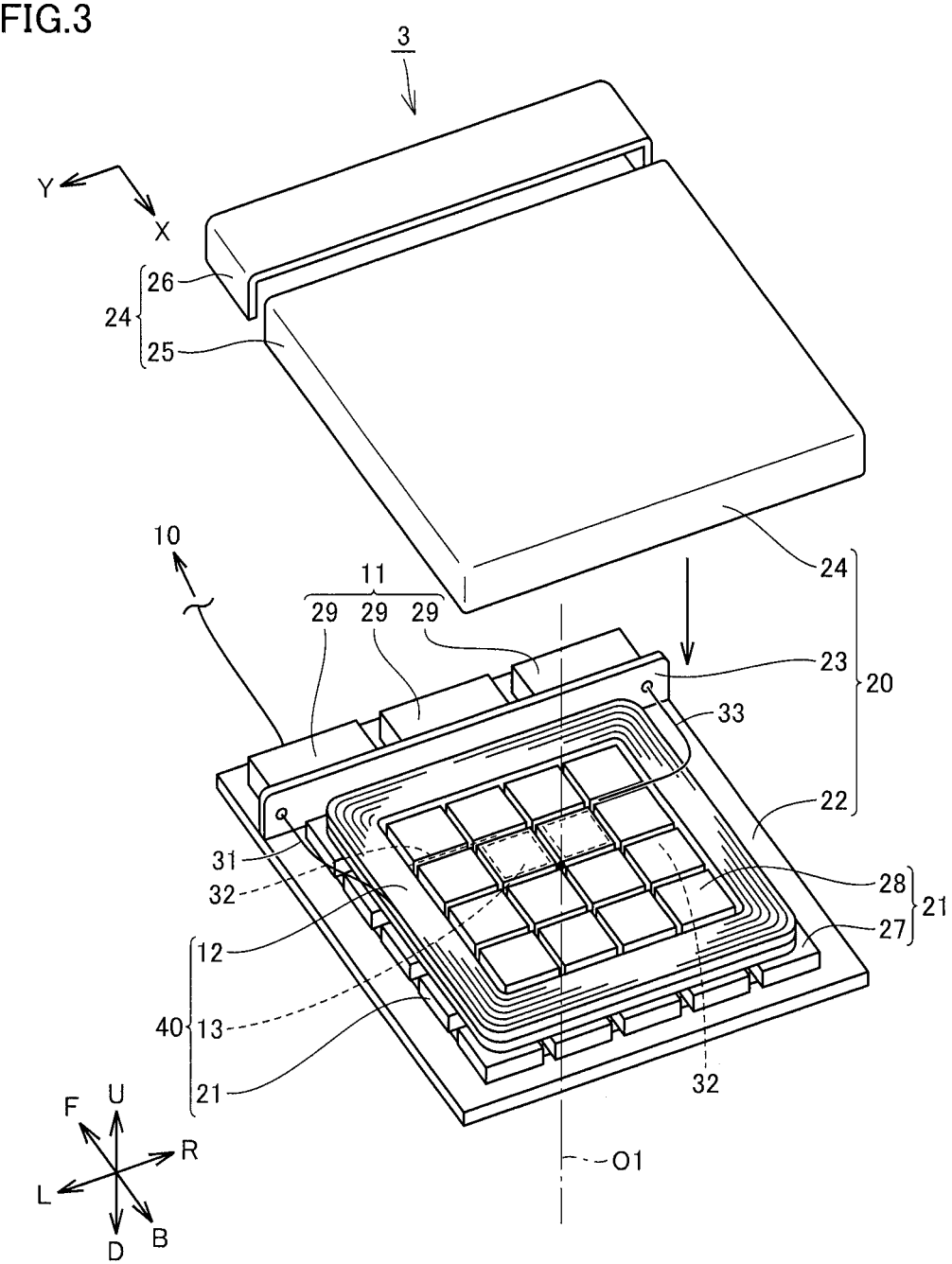
FIG. 3 is an exploded perspective view of a power transmitting device.

FIG. 3 is an exploded perspective view of power transmitting device 3, which includes a casing 20, a coil unit 40 accommodated in casing 20, and frequency converter 11 accommodated in casing 20.

Casing 20 includes a base plate 22, a partition 23 provided on base plate 22, and a lid 24 provided to cover base plate 22. Lid 24 includes a resin lid 25 and a metal lid 26, and resin lid 25 is attached to base plate 22 to form a space allowing coil unit 40 to be accommodated in casing 20. Metal lid 26 is attached to base plate 22 to form a space allowing frequency converter 11 to be accommodated in casing 20.

Partition 23 divides a space within casing 20 into a space allowing frequency converter 11 to be accommodated therein, and a space allowing coil unit 40 and other components to be accommodated therein.

Metal lid 26 minimizes (blocks) noise leaking externally from frequency converter 11. Furthermore, metal lid 26 protects frequency converter 11 from external force for example when the vehicle is placed on power transmitting device 3. Note that frequency converter 11 is formed of a plurality of high voltage devices 29.

Resin lid 25 is formed of a material allowing an electromagnetic field surrounding coil unit 40 to be transmitted therethrough when the power transmitting and receiving devices transfer electric power therebetween.

Coil unit 40 includes a ferrite member 21, power transmitting coil 12 disposed on an upper surface of ferrite member 21, and power transmitting capacitor 13 disposed on a lower surface of ferrite member 21.

Power transmitting coil 12 has one end connected to frequency converter 11 by a wiring 31 and the other end connected to power transmitting capacitor 13 by a wiring 32. Power transmitting capacitor 13 is connected to frequency converter 11 by a wiring 33.

Figure 4:
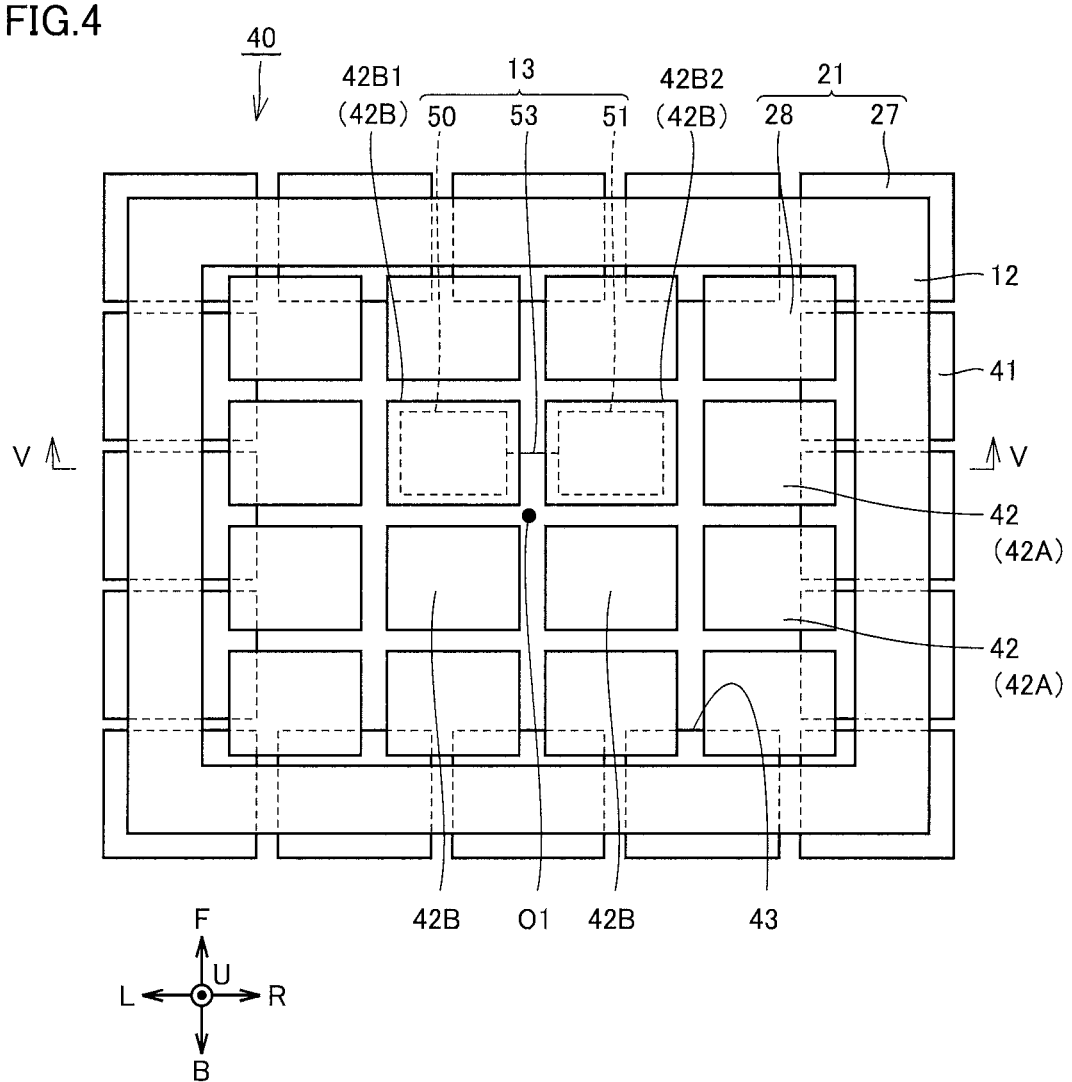
FIG. 4 is a plan view of a ferrite member, a power transmitting coil and other components as seen from above.

FIG. 4 is a plan view of ferrite member 21, power transmitting coil 12 and other components as seen from above. As shown in FIG. 4, ferrite member 21 includes an outer looped ferrite 27 and a center ferrite 28 disposed on outer looped ferrite 27.

Outer looped ferrite 27 is formed of a plurality of split pieces of ferrite 41 mutually spaced from each other and disposed in a loop. Accordingly, outer looped ferrite 27 has a center with an opening 43. Note that split pieces of ferrite 41 may, for example, be secured together with resin or by a securing member (not shown).

Center ferrite 28 is disposed at an upper surface of outer looped ferrite 27 so as to close opening 43 of outer looped ferrite 27. Center ferrite 28 includes a plurality of split pieces of ferrite (or a contact ferrite) 42A disposed in a loop in contact with a perimeter of the opening of outer looped ferrite 27, and a plurality of split pieces of ferrite (or an inner ferrite) 42B disposed inwardly of split pieces of ferrite 42A disposed in the loop.

Split pieces of ferrite 42A and 42B are mutually spaced from each other. Note that split pieces of ferrite 42A and 42B may be secured together with resin or the like or by a securing member (not shown).

Power transmitting coil 12 is formed of a coiled wire wound about a winding axis O1, and is implemented as a planar coil. Power transmitting coil 12 has winding axis O1 extending vertically, and is disposed on an upper surface of outer looped ferrite 27 and also surrounds center ferrite 28.

Power transmitting capacitor 13 includes a split capacitor 50, a split capacitor 51 electrically connected to split capacitor 50, and a wiring 53 connecting split capacitor 50 and split capacitor 51 together.

Figure 5:
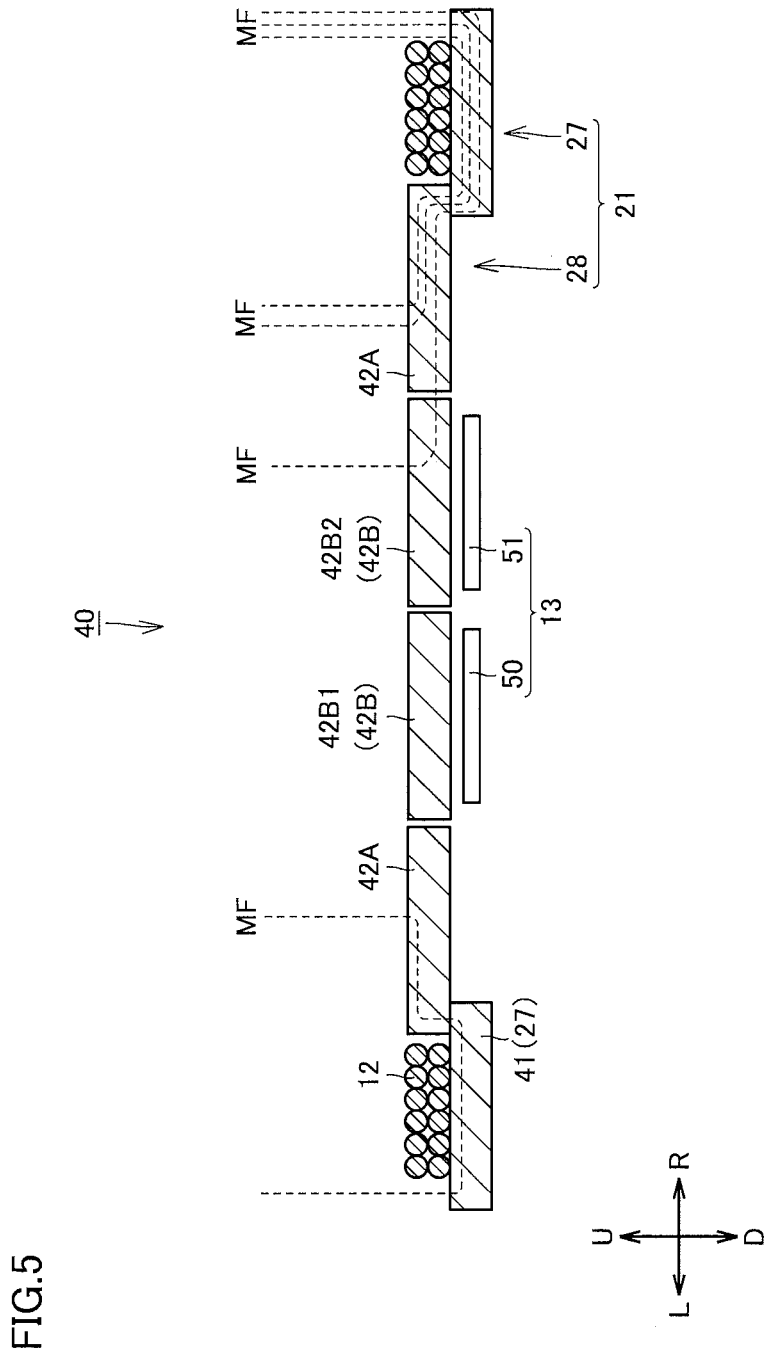
FIG. 5 is a cross section taken along a line V-V shown in FIG. 4.

FIG. 5 is a cross section taken along a line V-V shown in FIG. 4. As shown in FIG. 5, outer looped ferrite 27 and center ferrite 28 define a recess, and power transmitting capacitor 13 is accommodated in this recess. Note that split capacitor 50 is located on the side of a lower surface of split piece of ferrite 42B1, and split capacitor 51 is located on the side of a lower surface of split piece of ferrite 42B2.

Figure 6:
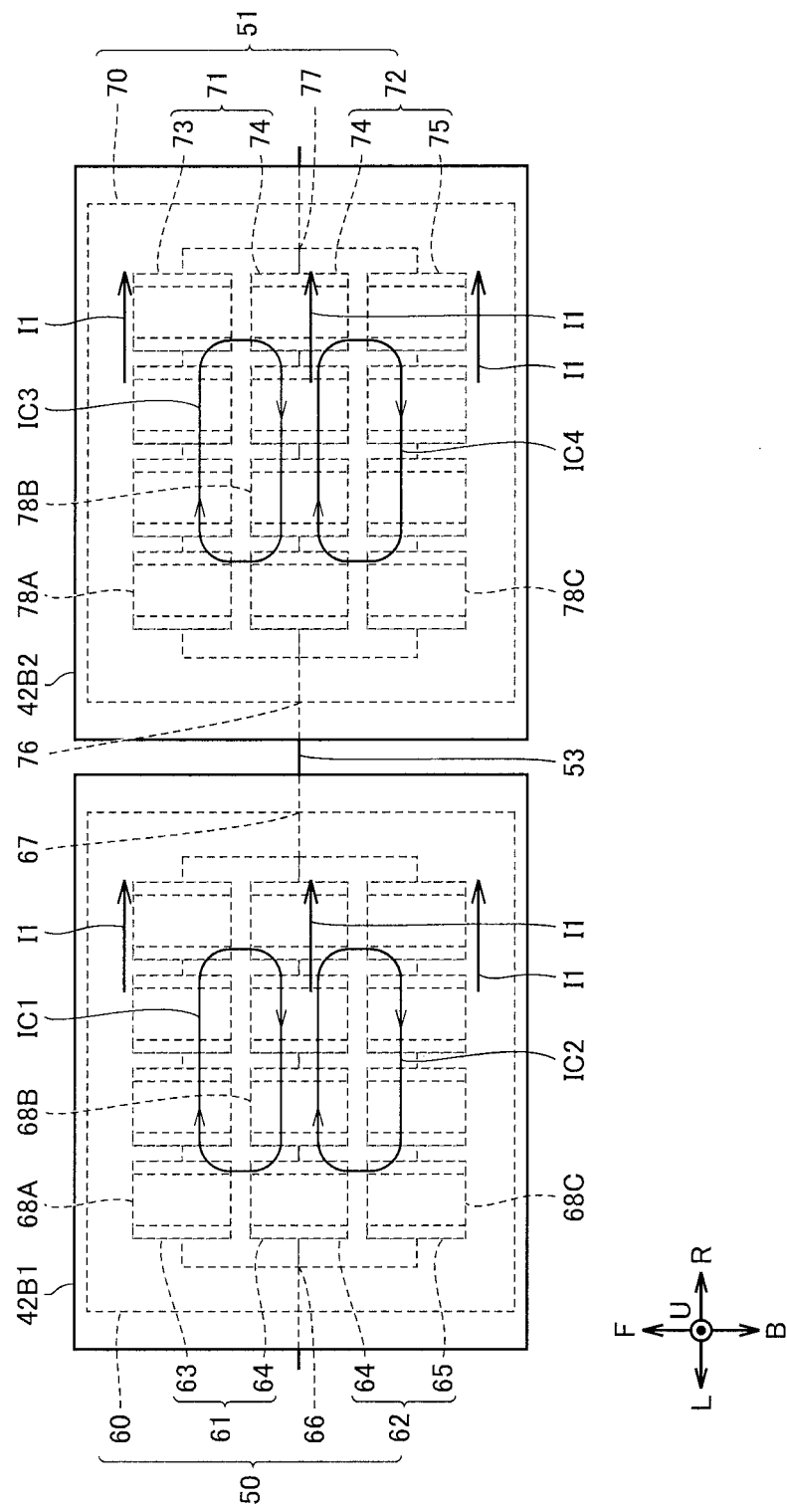
FIG. 6 is a plan view of split capacitors and split pieces of ferrite as seen from above.

FIG. 6 is a plan view of split capacitors 50, 51 and split pieces of ferrite 42B1, 42B2 as seen from above. As shown in FIG. 6, split capacitor 50 is located within the perimeter of split piece of ferrite 42B1 when viewed from above, and split capacitor 51 is located within the perimeter of split piece of ferrite 42B2 when viewed from above.

Split capacitor 50 includes an insulating substrate 60, and a closed loop circuit 61 and a closed loop circuit 62 formed on an upper surface of substrate 60. Closed loop circuits 61 and 62 may be formed on a lower surface of substrate 60.

When substrate 60 and split piece of ferrite 42B1 are seen in a plan view, closed loop circuit 61 and closed loop circuit 62 are located within the perimeter of split piece of ferrite 42B1.

Closed loop circuit 61 includes wiring connections 66 and 67, and a row of capacitor elements 63 and a row of capacitor elements 64 connected in parallel between wiring connection 66 and wiring connection 67. Closed loop circuit 62 includes wiring connections 66 and 67, and row of capacitor elements 64 and a row of capacitor elements 65 connected in parallel between wiring connection 66 and wiring connection 67.

Row of capacitor elements 63 includes a plurality of capacitor elements 68A connected in series between wiring connection 66 and wiring connection 67. Row of capacitor elements 64 includes a plurality of capacitor elements 68B connected in series between wiring connection 66 and wiring connection 67. Row of capacitor elements 65 includes a plurality of capacitor element 68C connected in series between wiring connection 66 and wiring connection 67.

To wiring connection 66 are connected a wiring connected to row of capacitor elements 63, a wiring connected to row of capacitor elements 64, a wiring connected to row of capacitor elements 65, and wiring 32 shown in FIG. 3. To wiring connection 67 are connected a wiring connected to row of capacitor elements 63, a wiring connected to row of capacitor elements 64, a wiring connected to row of capacitor elements 65, and wiring 53 shown in FIG. 4.

Split capacitor 51 includes an insulating substrate 70, and a closed loop circuit 71 and a closed loop circuit 72 formed on an upper surface of substrate 70.

When split capacitor 51 and split piece of ferrite 42B2 are seen in a plan view, closed loop circuit 71 and closed loop circuit 72 are located within the perimeter of split piece of ferrite 42B2.

Closed loop circuit 71 includes wiring connections 76 and 77, and a row of capacitor elements 73 and a row of capacitor elements 74 connected in parallel between wiring connection 76 and wiring connection 77. Closed loop circuit 72 includes wiring connections 76 and 77, and row of capacitor elements 74 and a row of capacitor elements 75 connected in parallel between wiring connection 76 and wiring connection 77. Row of capacitor elements 73 is formed of a plurality of capacitor elements 78A connected in series between wiring connection 76 and wiring connection 77. Row of capacitor elements 74 is formed of a plurality of capacitor elements 78B connected in series between wiring connection 76 and wiring connection 77. Row of capacitor elements 75 is formed of a plurality of capacitor elements 78C connected in series between wiring connection 76 and wiring connection 77. To wiring connection 76 are connected a wiring connected to row of capacitor elements 73, a wiring connected to row of capacitor elements 74, a wiring connected to row of capacitor elements 75, and wiring 53. To wiring connection 77 are connected a wiring connected to row of capacitor elements 73, a wiring connected to row of capacitor elements 74, a wiring connected to row of capacitor elements 75, and wiring 33.

Figure 7:
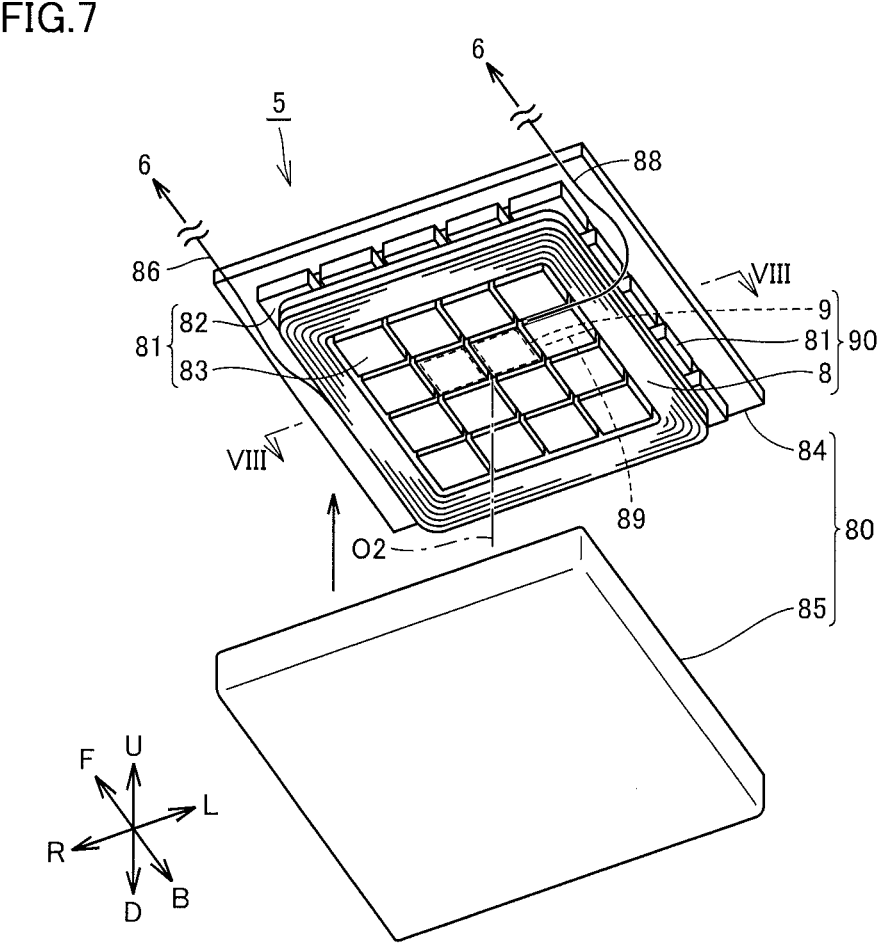
FIG. 7 is an exploded perspective view of a power receiving device.

FIG. 7 is an exploded perspective view of power receiving device 5. As shown in FIG. 7, power receiving device 5 includes a casing 80 and a coil unit 90 accommodated within casing 80.

Casing 80 includes a base plate 84 disposed under a floor panel of the vehicle, and a resin lid 85 disposed to cover base plate 84 from below. Resin lid 85 is attached to base plate 84 to form a space allowing coil unit 90 to be accommodated therein.

Coil unit 90 includes power receiving coil 8 accommodated in casing 80, power receiving capacitor 9, and a ferrite member 81.

Power receiving coil 8 is formed of a coiled wire wound about a winding axis O2, and power receiving coil 8 is disposed such that winding axis O2 extends vertically.

Power receiving coil 8 has one end connected to a wiring 86 connected to rectifier 6, and the other end connected to a wiring 89 connected to power receiving capacitor 9. Note that power receiving capacitor 9 is connected to a wiring 88 connected to rectifier 6.

Figure 8:
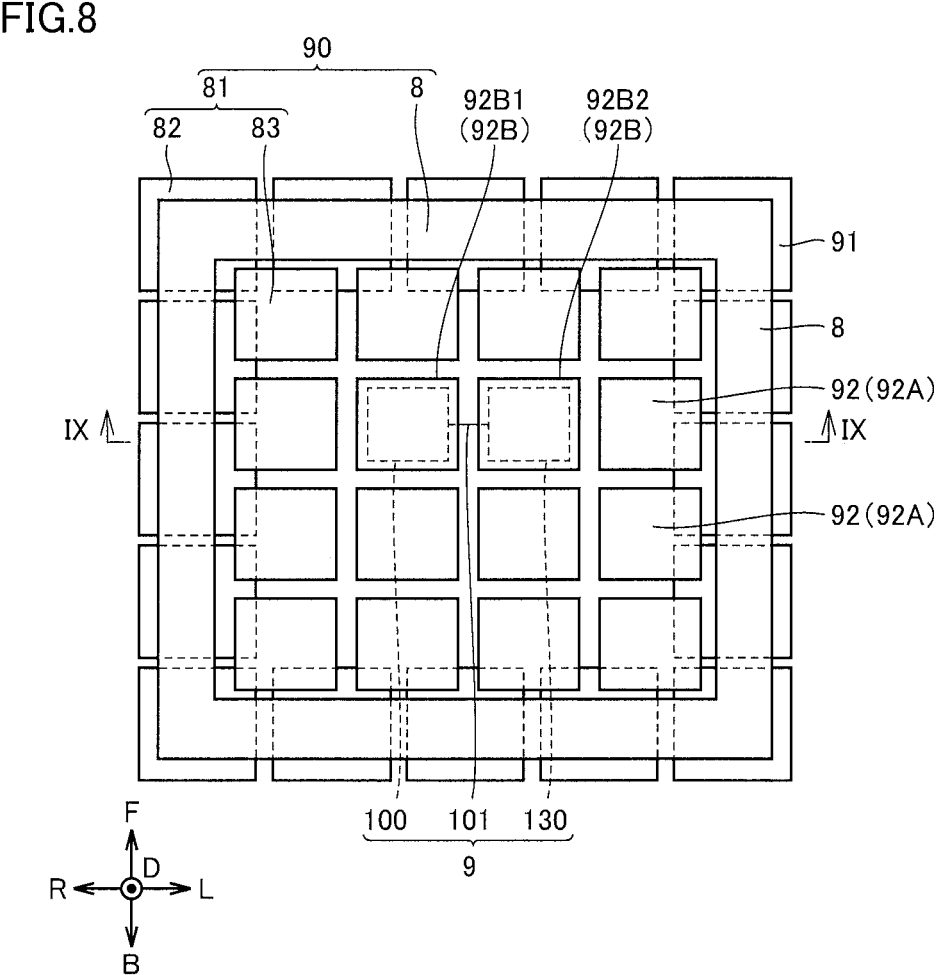
FIG. 8 is a plan view of a ferrite member and a power receiving capacitor as seen from below.

FIG. 8 is a plan view of ferrite member 81 and power receiving capacitor 9 as seen from below. As shown in FIG. 8, ferrite member 81 includes an outer looped ferrite 82 formed of a plurality of split pieces of ferrite 91 mutually spaced from each other and disposed in a loop, and a center ferrite 83 disposed to overlap an inner peripheral edge of outer looped ferrite 82. Since the plurality of split pieces of ferrite 91 are disposed in the loop, outer looped ferrite 82 has a center with an opening. Split pieces of ferrite 91 are integrated together for example with resin or the like.

Center ferrite 83 is disposed to close the opening of outer looped ferrite 82. Center ferrite 83 is disposed at the inner peripheral edge of outer looped ferrite 82 in contact with a lower surface thereof.

Center ferrite 83 includes a plurality of mutually spaced, split pieces of ferrite 92. Center ferrite 83 includes a plurality of split pieces of ferrite (or a contact ferrite) 92A disposed in a loop in contact with a perimeter of the opening of outer looped ferrite 82, and a plurality of split pieces of ferrite (or an inner ferrite) 92B disposed inwardly of split pieces of ferrite 92A.

Power receiving coil 8 is disposed on a lower surface of outer looped ferrite 82 and also surrounds center ferrite 83.

Power receiving capacitor 9 includes a split capacitor 100 and a split capacitor 130, and a connection wiring 101 connecting split capacitor 100 and split capacitor 130 together.

Figure 9:
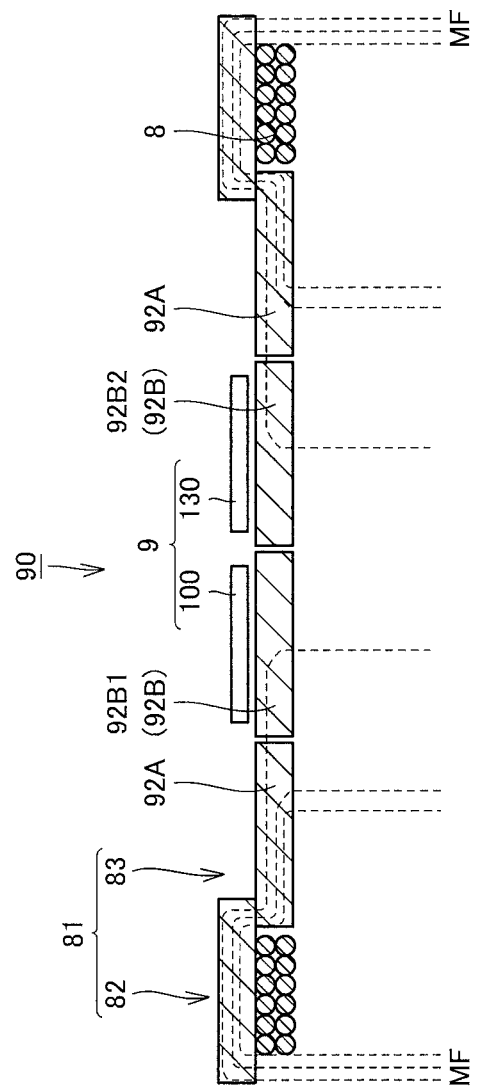
FIG. 9 is a cross section taken along a line IX-IX shown in FIG. 8.

FIG. 9 is a cross section taken along a line IX-IX shown in FIG. 8. As shown in FIG. 9, outer looped ferrite 82 and center ferrite 83 define a recess, and power receiving capacitor 9 is accommodated in this recess. This allows coil unit 90 to be reduced in thickness. Note that split capacitor 100 is disposed on an upper surface of split piece of ferrite 92B1, and split capacitor 130 is disposed on an upper surface of split piece of ferrite 92B2.

Figure 10:
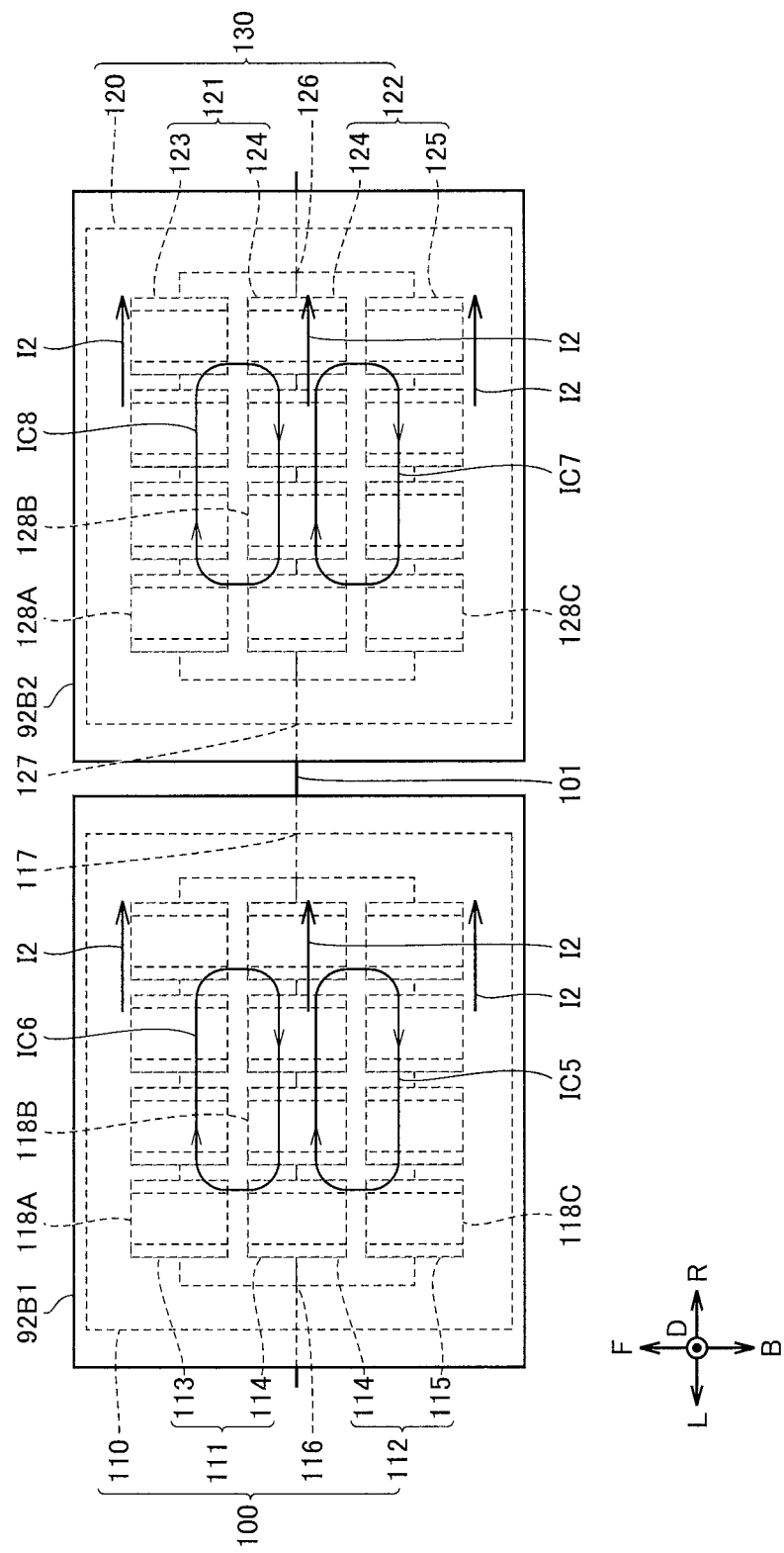
FIG. 10 is a plan view of split capacitors and split pieces of ferrite as seen from below.

FIG. 10 is a plan view of split capacitors 100, 130 and split pieces of ferrite 92B1, 92B2 as seen from below.

As shown in FIG. 10, split capacitor 100 is located within the perimeter of split piece of ferrite 92B1 when viewed from below, and split capacitor 130 is located within the perimeter of split piece of ferrite 92B2 when viewed from below.

Split capacitor 100 includes an insulating substrate 110, and a closed loop circuit 111 and a closed loop circuit 112 formed on a lower surface of substrate 110.

Closed loop circuit 111 includes wiring connections 116 and 117, and a row of capacitor elements 113 and a row of capacitor elements 114 connected in parallel between wiring connection 116 and wiring connection 117, and closed loop circuit 111 is located within split piece of ferrite 92B1 when seen in plan view.

Closed loop circuit 112 includes wiring connections 116 and 117, and row of capacitor elements 114 and a row of capacitor elements 115 connected in parallel between wiring connection 116 and wiring connection 117, and closed loop circuit 112 is located within split piece of ferrite 92B1 when seen in plan view.

To wiring connection 116 are connected a wiring connected to row of capacitor elements 113, a wiring connected to row of capacitor elements 114, a wiring connected to row of capacitor elements 115 and wiring 89 shown in FIG. 7. To wiring connection 117 are connected a wiring connected to row of capacitor elements 113, a wiring connected to row of capacitor elements 114, a wiring connected to row of capacitor elements 115 and connection wiring 101. Row of capacitor elements 113 is formed of a plurality of capacitor elements 118A connected in series between wiring connection 116 and wiring connection 117. Row of capacitor elements 114 is formed of a plurality of capacitor elements 118B connected in series between wiring connection 116 and wiring connection 117. Row of capacitor elements 115 is formed of a plurality of capacitor elements 118C connected in series between wiring connection 116 and wiring connection 117.

Split capacitor 130 includes an insulating substrate 120, and a closed loop circuit 121 and a closed loop circuit 122 formed on a lower surface of substrate 120. Closed loop circuits 121, 122 are located within split piece of ferrite 92B2 when seen in plan view.

Closed loop circuit 121 includes wiring connections 126 and 127, and row of capacitor elements 123 and a row of capacitor elements 124 connected in parallel between wiring connection 126 and wiring connection 127.

Closed loop circuit 122 includes wiring connections 126 and 127, and row of capacitor elements 124 and a row of capacitor elements 125 connected in parallel between wiring connection 126 and wiring connection 127.

Row of capacitor elements 123 is formed of a plurality of capacitor elements 128A connected in series between wiring connection 126 and wiring connection 127. Row of capacitor elements 124 is formed of a plurality of capacitor elements 128B connected in series between wiring connection 126 and wiring connection 127. Row of capacitor elements 125 is formed of a plurality of capacitor elements 128C connected in series between wiring connection 126 and wiring connection 127. To wiring connection 126 are connected a wiring connected to row of capacitor elements 123, a wiring connected to row of capacitor elements 124, a wiring connected to row of capacitor elements 125, and wiring 88 shown in FIG. 7. To wiring connection 127 are connected a wiring connected to row of capacitor elements 123, a wiring connected to row of capacitor elements 124, a wiring connected to row of capacitor elements 125, and connection wiring 101.

In FIG. 1, when power transmitting device 3 transmits electric power to power receiving device 5, frequency converter 11 receives a current from power supply 10 and converts its frequency to a prescribed frequency and also adjusts voltage, and supplies electric power to power transmitting coil 12.

As power transmitting coil 12 has a power transmitting current passing therethrough, power transmitting capacitor 13 also has the power transmitting current passing therethrough. In FIG. 6, when power transmitting capacitor 13 has a power transmitting current I1 passing therethrough, each split capacitor 50, 51 has power transmitting current I1 passing therethrough. In FIG. 6, power transmitting current I1 passes through wiring connection 66 toward wiring connection 67, and power transmitting current I1 passes through wiring connection 76 toward wiring connection 77. Thus power transmitting current I1 is passing through each row of capacitor elements 63, 64, 65, 73, 74, 75 in a single direction.

As power transmitting current I1 is passing through power transmitting coil 12, an electromagnetic field surrounding power transmitting coil 12 is formed and power transmitting coil 12 is surrounded by significant magnetic flux.

In FIG. 5, power transmitting coil 12 is surrounded by a magnetic flux MF, which, for example, enters split piece of ferrite 42A and passes therethrough and enters split piece of ferrite 41, and then exits at a side outwardly of power transmitting coil 12 toward power receiving device 5. Furthermore, a portion of magnetic flux MF enters split piece of ferrite 42B2 and passes therethrough, and enters split piece of ferrite 42A. Magnetic flux MF enters split piece of ferrite 41 from split piece of ferrite 42A, and then exits at a side outwardly of power transmitting coil 12 toward power receiving device 5. Note that the direction of magnetic flux MF is periodically inverted.

Note that split capacitor 50 is disposed on the side of the lower surface of split piece of ferrite 42B1, and as shown in FIG. 6, closed loop circuits 61, 62 are located within the perimeter of split piece of ferrite 42B1 when seen in plan view. Accordingly, magnetic flux MF entering from power receiving device 5 enters split piece of ferrite 42B1 before entering split capacitor 50, which minimizes magnetic flux MF traversing closed loop circuits 61, 62.

This minimizes magnetic flux MF traversing closed loop circuits 61, 62. If magnetic flux MF should traverse closed loop circuits 61, 62, magnetic flux MF causes induced currents IC1, IC2 which passes through closed loop circuits 61, 62.

If closed loop circuits 61, 62 have induced currents IC1, IC2 passing therethrough, the induced currents IC1, IC2 are added to power transmitting current I1 passing though each of capacitor elements 63, 64, 65. As a result, in the example of FIG. 6, row of capacitor elements 63 have passing therethrough a current that is power transmitting current I1 and induced current IC1 added together. Note that row of capacitor elements 65 have power transmitting current I1 minus induced current IC2 passing therethrough, and row of capacitor elements 64 has power transmitting current I1 passing therethrough.

The relationship between the directions of power transmitting current I1 and induced currents IC1, IC2 is periodically switched and inverted (they are the same or opposite) equally periodically, and accordingly, a current passing through row of capacitor elements 63 becomes larger than a current passing through rows of capacitor elements 64 and 65.

In the present embodiment, split piece of ferrite 42B1 is disposed closer to power receiving device 5 than closed loop circuits 61 and 62, and closed loop circuits 61 and 62 are located within the perimeter of split piece of ferrite 42B1 when seen in plan view, which minimizes magnetic flux MF traversing closed loop circuits 61 and 62. This can reduce induced currents IC1 and IC2 from passing through closed loop circuits 61 and 62, and thus prevent row of capacitor elements 63 from having an increased amount of current passing therethrough.

During the power transmission between the power transmitting device and the power receiving device, power transmitting current I1 passes through rows of capacitor elements 73, 74, 75. Split capacitor 51 is disposed on the side of the lower surface of split piece of ferrite 42B2, and closed loop circuits 71, 72 are located within the perimeter of split piece of ferrite 42B2 when seen in plan view. Thus, during the power transmission, magnetic flux MF traversing closed loop circuits 71 and 72 is minimized, and thus, induced currents IC3, IC4 passing through closed loop circuits 71 and 72 are minimized.

Thus split capacitor 51 can also be prevented from having a particular row of capacitor elements, i.e., row of capacitor elements 73, with a large current passing therethrough.

Wiring 53 is exposed at a gap between split piece of ferrite 42B1 and split piece of ferrite 42B2, and accordingly, during the power transmission, wiring 53 is traversed by magnetic flux MF. Wiring 53 is not configured to form a closed loop between wiring connection 67 and wiring connection 76, and if magnetic flux MF crosses wiring 53, no induced current passes between wiring connection 67 and wiring connection 76.

Thus, in the present embodiment, when power transmitting capacitor 13 and ferrite member 21 are seen in a plan view seen from above, power transmitting capacitor 13 has a closed loop circuit located within a perimeter of the split piece of ferrite, which minimizes an induced current passing through the closed loop circuit. That is, the capacitor 13 is located behind and thus is shielded from magnetic flux by, one of the split pieces of ferrite. Accordingly, the power transmitting device and the power receiving device can transfer electric power therebetween without a large current passing through any row of capacitor elements.

As shown in FIG. 9, in power receiving device 5, a large portion of magnetic flux MF coming from power transmitting device 3 passes through split piece of ferrite 92A of center ferrite 83 and outer looped ferrite 82. Furthermore, a portion of magnetic flux MF coming from power transmitting device 3 passes through split piece of ferrite 92B, split piece of ferrite 92A, and outer looped ferrite 82.

Induced voltage arises within power receiving coil 8 by magnetic flux MF, and power receiving coil 8 receives electric power.

When power receiving coil 8 receives electric power, then, in FIG. 10, a power receiving current passes through split capacitors 100, 130. In the example depicted in FIG. 10, a power receiving current I2 passes through the split capacitor 100 rows of capacitor elements 113, 114, and 115.

Split piece of ferrite 92B1 is disposed on the lower side of power receiving device 5 relative to closed loop circuits 111, 112, and closed loop circuits 111, 112 are located within the perimeter of the split piece of ferrite 92B1 when seen in plan view, which minimizes magnetic flux MF coming from power transmitting device 3 entering closed loop circuits 111, 112. This in turn reduces induced currents IC5, IC6 from being generated in closed loop circuits 111, 112.

This can prevent split capacitor 100 from having a particular row of capacitor elements, such as row of capacitor elements 123, with a large current passing therethrough.

For split capacitor 130 also, split piece of ferrite 92B2 is disposed on the lower side of power receiving device 5 relative to closed loop circuits 121, 122, and closed loop circuits 121, 122 are located within the perimeter of the split piece of ferrite 92B2 when seen in plan view. This minimizes magnetic flux MF coming from power transmitting device 3 entering closed loop circuits 121, 122, and reduces induced currents IC7, IC8 from being generated in closed loop circuits 121, 122.

This can prevent split capacitor 130 from having some row of capacitor elements, such as row of capacitor elements 123, with a large current passing therethrough when receiving electric power.

In FIG. 6, power transmitting capacitor 13 is split into split capacitor 50 and split capacitor 51, and each split capacitor 50, 51 thus has a size reduced to be small. Accordingly, split capacitors 50 and 51 can be covered with split pieces of ferrite 42B1 and 42B2 of a small size. Split pieces of ferrite 42B1 and 42B2 can thus avoid having a large size and thus avoid a detriment such as being chipped due to external impact. Furthermore, by having a small size of the split piece of ferrite, the cost of the split piece of ferrite can be reduced.

Similarly, power receiving capacitor 9 is also split into split capacitor 100 and split capacitor 130, and accordingly, split piece of ferrite 92B1 and split piece of ferrite 92B2 can be reduced to be small in size. This can avoid chipping of the split pieces of ferrite and also allows them to reduce the cost of the split pieces of ferrite.

In FIG. 5, power transmitting capacitor 13 is located within a recess formed by center ferrite 28 and outer looped ferrite 27, and outer looped ferrite 27 is located at a position horizontally adjacent to power transmitting capacitor 13.

A magnetic path extending from an outer peripheral side of outer looped ferrite 27, passing through the air and then through power transmitting capacitor 13 and then entering center ferrite 28, is much higher in magnetic resistance than a magnetic path passing through outer looped ferrite 27 and center ferrite 28.

Accordingly, there is not substantial magnetic flux MF entering transmitting capacitor 13 from a side adjacent to outer looped ferrite 27, which can reduce the amount of magnetic flux traversing power transmitting capacitor 13. This can prevent split capacitors 50, 51 from having a particular row of capacitor elements with a large current passing therethrough.

Similarly, as shown in FIG. 9, power receiving capacitor 9 is disposed within the recess formed of outer looped ferrite 82 and center ferrite 83. Accordingly, outer looped ferrite 82 is located at a position horizontally adjacent to power receiving capacitor 9.

This can reduce the amount of magnetic flux entering power receiving capacitor 9 through an outer peripheral side adjacent to outer looped ferrite 82. This can prevent split capacitors 100, 130 from having a particular row of capacitor elements with a large current passing therethrough.

In FIG. 5, ferrite member 21 includes outer looped ferrite 27 and center ferrite 28, and center ferrite 83 includes split pieces of ferrite 42A disposed in a loop and split pieces of ferrite 42B1, 42B2 disposed inwardly of split pieces of ferrite 42A. And split capacitors 50 and 51 are disposed on the side of the lower surfaces of split pieces of ferrite 42B1 and 42B2. Note that there is a gap between split pieces of ferrite 42B1, 42B2 and split piece of ferrite 42A, and accordingly, a magnetic path passing through split piece of ferrite 42B1, 42B2, split piece of ferrite 42A and split piece of ferrite 41 has a larger magnetic resistance than a magnetic path passing through split piece of ferrite 42A and split piece of ferrite 41. Accordingly, an amount of magnetic flux passing through split pieces of ferrite 42B1, 42B2 is smaller than that passing through split piece of ferrite 42A. Split pieces of ferrite 4281, 42B2 with a small amount of magnetic flux passing therethrough can contribute to reducing the amount of magnetic flux penetrating split pieces of ferrite 42B1, 42B2 and leaking toward split capacitors 50, 51. This can reduce magnetic flux MF traversing the closed loop circuits of split capacitors 50, 51 and prevent split capacitors 50, 51 from having a row of capacitor elements with a large current passing therethrough.

Furthermore, split capacitors 50 and 51 are disposed on split pieces of ferrite 42B1, 42B2 disposed inwardly of split pieces of ferrite 42A disposed in a loop. Split capacitors 50 and 51 thus have a large distance to the outer peripheral portion of outer looped ferrite 27, which minimizes magnetic flux MF reaching split capacitors 50, 51 from the outer peripheral side of outer looped ferrite 27 through the air.

In FIG. 9, similarly, ferrite member 81 includes outer looped ferrite 82 and center ferrite 83, and center ferrite 83 includes split pieces of ferrite 92A disposed in a loop and split pieces of ferrite 92B1, 92B2 disposed inwardly of split pieces of ferrite 92A. And split capacitors 100, 130 are disposed on the side of the upper surfaces of split pieces of ferrite 92B1, 92B2.

Note that a gap is formed between split pieces of ferrite 92B1, 92B2 and split piece of ferrite 92A. Accordingly, a magnetic path passing through split piece of ferrite 92B, split piece of ferrite 92A and outer looped ferrite 82 has a larger magnetic resistance than a magnetic path passing through split piece of ferrite 92A and outer looped ferrite 82. Accordingly, an amount of magnetic flux passing through split pieces of ferrite 92B1, 92B2 is smaller than that passing through split piece of ferrite 92A. This can contribute to reducing the amount of magnetic flux penetrating split pieces of ferrite 92B1, 92B2 and leaking toward split capacitors 100, 130. This can reduce an induced current from being generated in the closed loop circuits of split capacitors 100, 130 and prevent split capacitors 100, 130 from having a row of capacitor elements with a large current passing therethrough.

Furthermore, split pieces of ferrite 92B1, 92B2 are disposed inwardly of split pieces of ferrite 92A disposed in a loop, and thus there is a large distance between the outer peripheral portion of outer looped ferrite 82 and split capacitors 100, 130. This minimizes magnetic flux MF entering split capacitors 100, 130 from the outer peripheral side of outer looped ferrite 82 through the air.

Note that while in the present embodiment each closed loop circuit is formed so that rows of capacitor elements may be connected in parallel between wiring connections, capacitor elements may alternatively be connected in parallel between the wiring connections.

It should be understood that the embodiments disclosed herein have been described for the purpose of illustration only and in a non-restrictive manner in any respect.

What is claimed is:

1. A power receiving device comprising:
   a ferrite member including a plurality of pieces of ferrite, at least some of the pieces of ferrite being spaced from adjacent pieces of ferrite;
   a power receiving coil disposed on a lower surface side of the ferrite member; and
   a power receiving capacitor disposed on an upper surface side of the ferrite member,
   the power receiving capacitor having a closed loop circuit including a first wiring connection, a second wiring connection, and a plurality of capacitor elements connected in parallel between the first wiring connection and the second wiring connection, wherein:
   the ferrite member includes an outer looped ferrite and a center ferrite, the outer looped ferrite including a plurality of the pieces of ferrite disposed in a loop to form an opening and having a lower surface on which the power receiving coil is disposed, the center ferrite being disposed on the lower surface side of the outer looped ferrite and covering the opening,
   the center ferrite includes a plurality of contact pieces of ferrite and an inner ferrite, the plurality of contact pieces of ferrite disposed in a loop in contact with an edge of the opening of the outer looped ferrite, the inner ferrite disposed inwardly of the contact pieces of ferrite, and
   when the power receiving capacitor and the ferrite member are viewed from the lower surface side of the ferrite member, the closed loop circuit is located behind and within a perimeter of one of the pieces of ferrite, the one of the pieces of ferrite being of the inner ferrite.

2. The power receiving device according to claim 1, wherein:
   the inner ferrite includes a first piece of ferrite and a second piece of ferrite;

the power receiving capacitor includes another closed loop circuit connected to the closed loop circuit, and a wiring connecting the closed loop circuit and the other closed loop circuit together;

the other closed loop circuit includes a third wiring connection, a fourth wiring connection, and a plurality of capacitor elements connected in parallel between the third wiring connection and the fourth wiring connection; and when the power receiving capacitor and the ferrite member are viewed from the lower surface side of the ferrite member, the closed loop circuit and the other closed loop circuit are located behind and within the perimeter of the first piece of ferrite and the second piece of ferrite, respectively.

3. The power receiving device according to claim 1, wherein:

the power receiving capacitor is disposed within a recess formed by the outer looped ferrite and the center ferrite.

4. A power transmitting device comprising:

a ferrite member including a plurality of pieces of ferrite, at least some of the pieces of ferrite being spaced from adjacent pieces of ferrite;

a power transmitting coil disposed on an upper surface side of the ferrite member; and a power transmitting capacitor disposed on a lower surface side of the ferrite member;

the power transmitting capacitor having a closed loop circuit including a first wiring connection, a second wiring connection, and a plurality of capacitor elements connected in parallel between the first wiring connection and the second wiring connection, wherein:

the ferrite member includes an outer looped ferrite and a center ferrite, the outer looped ferrite including a plurality of the pieces of ferrite disposed in a loop to form an opening and having an upper surface on which the power transmitting coil is disposed, the center ferrite being disposed on the upper surface side of the outer looped ferrite and covering the opening, the center ferrite includes a plurality of contact pieces of ferrite and an inner ferrite, the plurality of contact pieces of ferrite disposed in a loop in contact with an edge of the opening of the outer looped ferrite, the inner ferrite disposed inwardly of the contact pieces of ferrite, and when the power transmitting capacitor and the ferrite member are viewed from the upper surface side of the ferrite member, the closed loop circuit is located behind and within a perimeter of one of the pieces of ferrite, the one of the pieces of ferrite being of the inner ferrite.

5. The power transmitting device according to claim 4, wherein:

the inner ferrite includes a first piece of ferrite and a second piece of ferrite;

the power transmitting capacitor includes another closed loop circuit connected to the closed loop circuit, and a wiring connecting the closed loop circuit and the other closed loop circuit together;

the other closed loop circuit includes a third wiring connection, a fourth wiring connection, and a plurality of capacitor elements connected in parallel between the third wiring connection and the fourth wiring connection; and when the power transmitting capacitor and the ferrite member are viewed from the upper surface side of the ferrite member, the closed loop circuit and the other closed loop circuit are located behind and within the perimeter of the first piece of ferrite and the second piece of ferrite, respectively.

6. The power transmitting device according to claim 4, wherein:

the power transmitting capacitor is disposed within a recess formed by the outer looped ferrite and the center ferrite.

* * * * *